April 21, 1970   D. W. DUDLEY ET AL   3,508,256
ELECTROMAGNETIC POSITIONED INDICATOR WHEEL
Filed Jan. 17, 1967                2 Sheets-Sheet 1
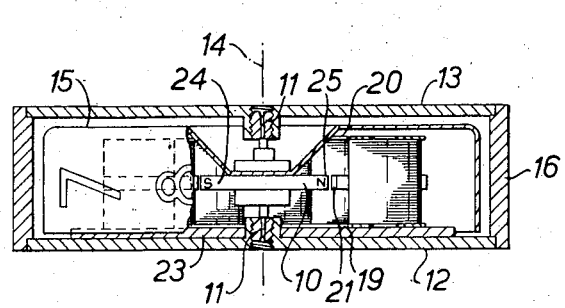
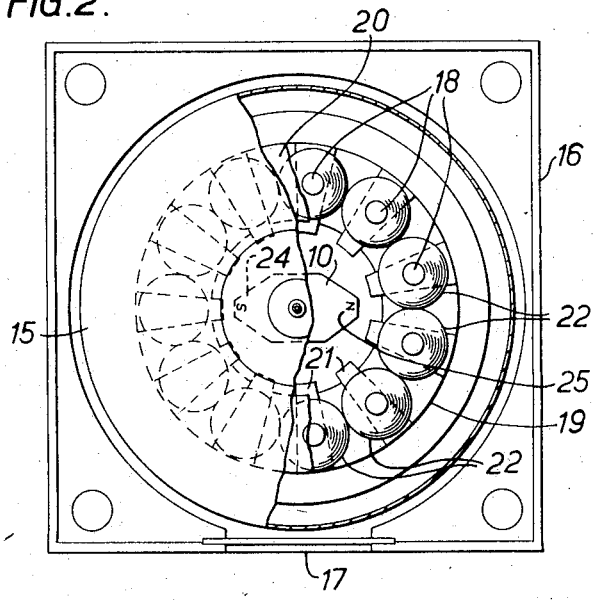
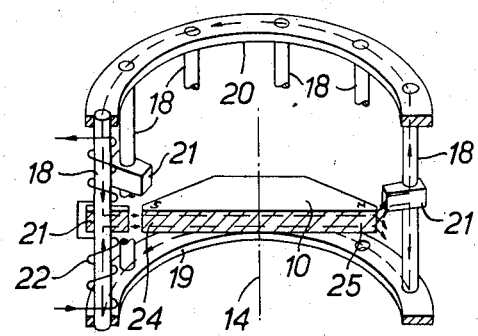
DENNIS WILLIAM DUDLEY
ARTHUR JAMES EDGE
GERALD NOEL WRIGHT - Inventors
Moore and Hall   -Attorneys April 21, 1970   D. W. DUDLEY ET AL   3,508,256
ELECTROMAGNETIC POSITIONED INDICATOR WHEEL
Filed Jan. 17, 1967   2 Sheets-Sheet 2
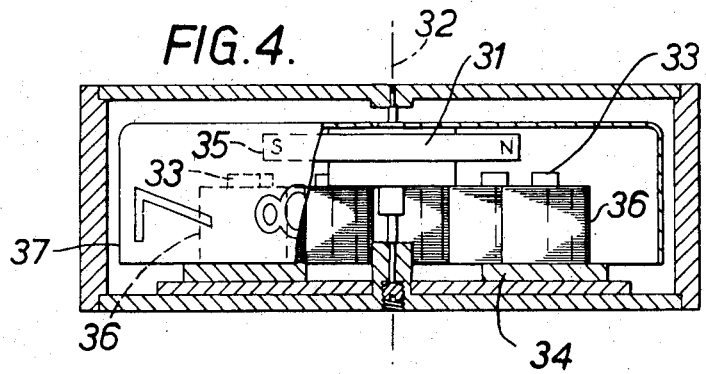
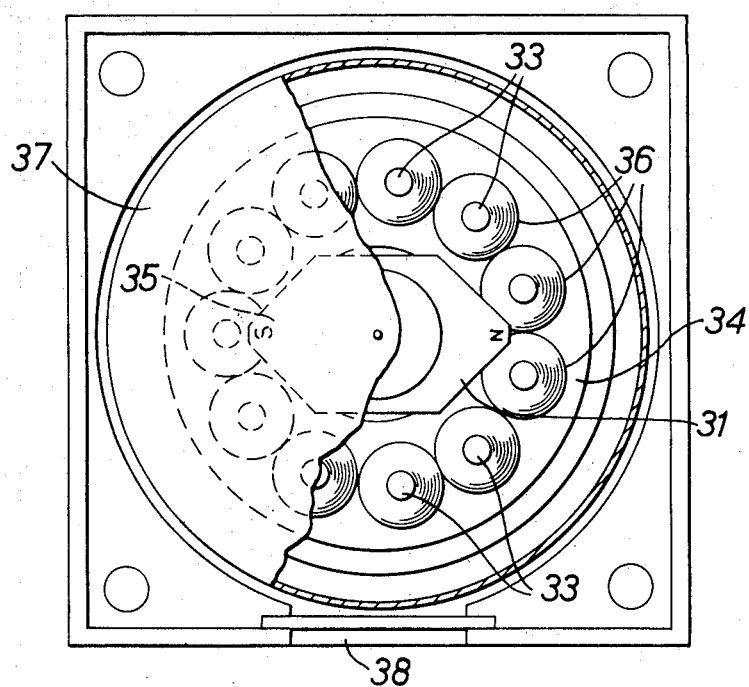
DENNIS WILLIAM DUDLEY
ARTHUR JAMES EDGE
GERALD NOEL WRIGHT - Inventors
Moore and Hall   -Attorneys United States Patent Office 3,508,256
Patented Apr. 21, 1970

3,508,256
ELECTROMAGNETIC POSITIONED INDICATOR WHEEL
Dennis William Dudley, Tewkesbury, and Arthur James Edge, Cheltenham, England, and Gerald Noel Wright, Edinburgh, Scotland, assignors to Smiths Industries Limited, London, England
Filed Jan. 17, 1967, Ser. No. 609,892
Claims priority, application Great Britain, Jan. 20, 1966, 2,746/66
Int. Cl. G08b 5/22
U.S. Cl. 340—378
10 Claims

ABSTRACT OF THE DISCLOSURE

An electromagnetic digital-drum indicator having a magnet rotatable within a circle of individually energizable pole-pieces, the pole-pieces projecting towards the magnet from at least one yoke-member that is spaced from the magnet along the rotational axis. The yoke-member interconnects the pole-pieces with low magnetic reluctance so that the magnet once attracted into register with any pole-piece remains there by its own magnetization until attracted away by pulse-energization of another pole-piece.

---

This invention relates to electromagnetic devices.

The invention is particularly concerned with electromagnetic devices of the kind in which a permanent magnet is mounted for angular displacement with respect to a multiplicty of angularly-spaced ferromagnetic elements that are provided with electrical windings, energization of different ones of the windings bringing the magnet by magnetic attraction into register with different ones of said elements.

With a known form of electromagnetic device of this kind, a yoke-member encircles the magnet and the ferromagnetic elements, carrying individual electrical windings, extend radially inwards from the yoke-member towards the magnet. One main disadvantage of this known form of device is that it does not lend itself to construction in small size. It is necessary to allow between the radially-extending ferromagnetic elements, and all within the compass of the encircling yoke-member, sufficient spacing to accommodate the windings, and so the resulting size of device is dictated to a large extent by the dimensions of the winding needed on each of the ferromagnetic elements; an increase in winding-dimensions, even if of small magnitude, requires a substantial increase in the overall dimension of the device.

It is an object of the present invention to provide an electromagnetic device that may be used to overcome the above-mentioned disadvantage.

According to the present invention, in an electromagnetic device, a permanent magnet is mounted for angular displacement about an axis that is substantially normal to its magnetization, a multiplicity of ferromagnetic elements that are spaced angularly from one another about said axis extend towards the magnet from a ferromagnetic yoke-member which is spaced from the magnet along said axis, said yoke-member providing low-reluctance magnetic interconnection of said elements such that when the magnet is brought into register about said axis with any one of said elements its own magnetization acting via the relevant element and said yoke-member is effective to restrain it in this position, and a multiplicity of electrical windings are inductively coupled to said elements for use in temporarily magnetizing said elements selectively, energization of different ones of said windings bringing said magnet by magnetic attraction into register with different ones of said elements.

The electromagnetic device of the present invention lends itself readily to construction in small size. With the yoke-member spaced from the magnet along the axis of the magnet, the yoke-member does not need to be as large in overall dimension as with the previously-known construction since it is not required to encompass the ferromagnetic elements and their windings. Additionally, the ferromagnetic elements of the device according to the present invention, do not extend towards the magnet in the radially-converging manner of the previously-known construction, so the windings may be provided on the ferromagnetic elements in a regular manner without any inherent wastage of space.

The ferromagnetic elements of the device according to the present invention may be spaced from one another to encircle said axis, and if in this case they are equally spaced, then it is generally preferable that there be an odd number of the elements so that no two elements lie diametrically opposite one another.

The electromagnetic device of the present invention may be used as an indicating device and in this case an indicating element may be coupled to the magnet for movement therewith. The indicating element may be a character-bearing drum carried coaxially with the magnet about said axis. The characters borne by the drum may be numerical digits; more specifically, the characters may be the decimal digits 0 to 9, the electromagnetic indicating device in these circumstances being provided as a decimal drum-indicator.

Two electromagnetic indicating devices, which are both provided as decimal drum-indicators and which are both in accordance with the present invention, will now be described, by way of example, with reference to the accompanying drawings, in which:

FIGURE 1 is a part-sectional front elevation of a first of the two decimal drum-indicators;

FIGURE 2 is a part-sectional side elevation of the first decimal drum-indicator with one of two end-plates of its casing demoved;

FIGURE 3 is a schematic representation of part of the decimal drum-indicator of FIGURES 1 and 2 showing magnetic circuits that are effective therein;

FIGURE 4 is a part-sectional front elevation of the second decimal drum-indicator; and FIGURE 5 is a part-sectional side elevation of the second decimal drum-indicator.

Referring to FIGURES 1 to 3, a magnet 10 which is permanently magnetized along its length is mounted in plain bearings 11 between two square aluminium end-plates 12 and 13 for rotation about an axis 14 that is substantially normal to the magnetization of the magnet 10. The magnet 10 carries a cylindrical aluminium drum 15 for rotation coaxially therewith about the axis 14 within a rectangular casing 16 that is closed at opposite ends by the two end-plates 12 and 13, so that according to the angular position of the magnet 10 about the axis 14 one or other of the ten digits 0–9 inscribed in ordered sequence around the outer cylindrical surface of the drum 15 is visible through a rectangular window 17 in the casing 16.

Eleven soft-iron pins 18 that are equally-spaced angularly from one another about the axis 14 to encircle the magnet 10, extend parallel to the axis 14 between two soft-iron yoke-rings 19 and 20 within the drum 15, the yoke-ring 19, and with it the pins 18 and yoke-ring 20, being carried by the end-plate 12 of the casing 16. The yoke-rings 19 and 20, providing low-reluctance magnetic interconnection of the pins 18 at either end, are equally spaced from the magnet 10 in opposite directions along the axis 14, so that from each yoke-ring 19 and 20 the pins 18 extend towards the magnet 10 parallel to the axis 14.

Each pin 18 has at its mid-point an individual soft-iron tooth-piece 21 that projects radially inwards towards the magnet 10, and also carries an individual electrical winding 22 that is wound on the pin 18 in opposite sense on either side of the tooth-piece 21. The windings 22 are connected (all in the same sense) each between an individually-allocated one of a series of eleven terminal-contacts (not shown) provided at the rear of the casing 16 and a twelfth terminal-contact (not shown) that is common to all the eleven windings 22 and is also provided at the rear of the casing 16. The connections to the windings 22 from the twelve terminal-contacts are made by means of a printed-circuit board 23 mounted beneath the yoke-ring 19 on the end-plate 12.

When the magnet 10 is brought into register about the axis 14 with any one of the eleven pins 18, with its SOUTH pole 24 adjacent the tooth-piece 21 of that pin 18, it is restrained in this position by its own magnetization acting via this tooth-piece 21 and pin 18. As indicated generally by broken lines in FIGURE 3, there are two magnetic circuits for magnetic flux from the magnet 10, one extending via the yoke-ring 19 and the other via the yoke-ring 20, and in each of these the flux from the NORTH pole 25 of the magnet 11 passes via the relevant yoke-ring 19 or 20 to be returned to the SOUTH pole 24 almost exclusively via the one pin 18. Since there is an odd number (eleven) of the equally-spaced pins 18, the NORTH pole 25 of the magnet 10 lies intermediate two of the pins 18, and accordingly the flux from the pole 25 is divided almost wholly between these two pins 18 and is passed by them to the yoke-rings 19 and 20 in the two magnetic circuits.

There are eleven positions of the magnet 10 about the axis 14 in which, as referred to above, it is restrained by its own magnetization in register with a pin 18 and with its SOUTH pole 24 adjacent the tooth-piece 21 of the pin 18. The ten digits 0 to 9 inscribed on the drum 15 are presented before the window 17 in ten of these eleven "index" positions, a different one of the digits being presented in each of the ten positions such that as the magnet 10 is rotated (clockwise in FIGURE 2) in sequence through these positions, so the digits 0 to 9 become visible in sequence through the window 17. The portion of the drum 15 that is visible through the window 17 when the magnet 10 is in the eleventh index position has no inscription and is left blank.

When the magnet 10 is in any one of its eleven index positions it can be made to rotate into any other index position that may be desired, simply by supplying direct electric current to flow in the electrical winding 22 wound on the pin 18 of the desired position. The supply of current to the winding 22, which winding is wound in opposite senses on the two halves of the pin 18, magnetizes the two halves of the pin 18 in opposite sense so as to produce a common magnetic pole at the tooth-piece 21 of the pin 18. The current is in all cases supplied to the winding 22 in the sense to make the tooth-piece 21 a NORTH pole and thereby attract the SOUTH pole 24 (and repel the NORTH pole 25) of the magnet 10. The supply of direct current in this manner to the winding 22 of any one of the pins 18 is effective, by virtue of the magnetic attraction exerted on the pole 24, to rotate the magnet 10 into the index position of that pin 18 from any other of the eleven index positions. The supply of current to the winding 22 is necessary only to achieve the rotation of the magnet 10 into the desired index position, the magnetization of the magnet 10 being by itself sufficient to restrain the magnet 10 in this position once it has been brought there. Accordingly therefore, the indicator can be caused to display through the window 17 any selected one of the digits 0 to 9 simply by supplying a pulse of current to an appropriate one of the windings 22; the digit selected is then displayed by the indicator until a pulse of current is supplied to another of the windings, whereupon it is rotated out of view. By supplying pulses of current to the eleven windings one at a time in turn, the drum 15 is rotated through one revolution with the magnet 10 stepping progressively through the series of eleven index positions.

Where an equal spacing of index positions is used, it is desirable to provide an odd number of such positions in order to provide an odd number of such positions in order to avoid the location of pins 18 diametrically opposite one another. With an even number of index positions, each pin 18 has a diametrically-opposed pin 18 and the ability to attract the magnet 10 from one index position directly into the diametrically-opposed one cannot be assured; the torque exerted on the magnet 10 by the magnetic attraction and repulsion is, at least theoretically, zero in these circumstances. The use of an odd number of index positions ensures that the torque exerted on the magnet 10 is significant in all possible circumstances, so that rotation of the magnet 10 from one index position to any other can be achieved directly.

Damping of the magnet 10 about the axis 14 is provided by silicone oil introduced in the bearings 11. The oil has a viscosity of, for example, 690 centistokes.

A decimal drum-indicator that has been constructed as described above with reference to FIGURES 1 to 3 with an overall width (measured parallel to the axis 14) of 0.4 inch, is operable by means of pulses having an amplitude of six volts and a current magnitude of 125 milliamperes. The time taken in switching as a discrete step from one displayed digit to the next in sequence is 240 milliseconds, and the maximum time taken to switch to any other digit is 475 milliseconds. The speed of continuous rotation of the drum 15 that can be achieved with this indicator by energizing the windings 22 in turn is as much as one hundred revolutions per minute.

As a modification of the indicator described above, the yoke-ring 19 may be arranged to act also as an end-plate of the indicator, thereby combining its own function with that of the end-plate 12.

The use of two yoke-members providing two magnetic circuits, as in the indicator described above with reference to FIGURES 1 to 3, is not essential, and a form of decimal drum-indicator using only one such magnetic circuit will now be described with reference to FIGURES 4 and 5. The basic construction of the indicator shown in FIGURES 4 and 5 is similar to that of the indicator described with reference to FIGURES 1 to 3, and brief reference will be made only to those points of significant difference.

Referring to FIGURES 4 and 5, a permanent magnet 31 is mounted for rotation about an axis 32 substantially normal to its magnetization. Eleven soft-iron pins 33 that are equally-spaced from one another about the axis 32 extend towards the magnet 31 from a soft-iron yoke-ring 34 which is spaced along the axis 32 from the magnet 31. The yoke-ring 34 provides low-reluctance magnetic interconnection of the pins 33 such that when the magnet 31 is brought into register about the axis 32 with any one of the pins 33 and with its SOUTH pole 35 adjacent thereto, the magnetization of the magnet 31 acting via this one pin 33 and the yoke-ring 34, is effective to restrain the magnet 31 in this position. Thus, once brought into any one of the eleven index positions defined in this way by the pins 33, the magnet 31 is restrained there by its own magnetization.

An individual electrical winding 36 is wound on each pin 33 for use in rotating the magnet 31 from one index position to another as desired. When change in index position is required, the winding 36 on the pin 33 of the relevant index position is energized in the sense appropriate to attract to that pin 33 the SOUTH pole 35 of the magnet 31.

The magnet 31 carries an aluminium drum 37 that is inscribed with the ten digits 0 to 9 such that movement of the magnet 31 through ten successive index positions brings the digit 0 to 9 into view through a window 38.

The portion of the drum 37 that is visible through the window 38 in the eleventh index position is blank.

The air-gaps between the free ends of the pins 33 and the magnet 31, may be reduced by providing at these ends soft-iron tooth-pieces (not shown) that correspond to the tooth-pieces 21 of the indicator of FIGURES 1 to 3 and project radially inwards towards the magnet 31.

With either of the two forms of indicator described above it may be found an advantage to arrange that the spacing of the NORTH pole of the magnet (10 or 31) from the rotational axis (14 or 32) is less than that of the SOUTH pole (24 or 35). This tends to provide for more positive and direct switching of the magnet (10 or 31) between index positions.

A convenient plural-digit display may be provided using two or more drum-indicators of the form described with reference to FIGURES 1 to 3, or of the form described with reference to FIGURES 4 and 5, the drum-indicator being assembled along side one another with their drum-axes (14 or 32) and viewing windows (17 or 38) aligned. Where a decimal-point is to be included in the display the eleventh, blank position on the drum of each indicator may be inscribed with a decimal-point. In this way the decimal-point may be made to occur at any position along the length of the display, simply by causing the indicator in the relevant position to display the eleventh drum-position.

We claim:

1. An electromagnetic device comprising a permanent magnet mounted for angular displacement about an axis that is substantially normal to the magnetization of the magnet, a ferromagnetic yoke-member, means mounting said yoke-member spaced along said axis from the magnet's rotational plane, a multiplicity of ferromagnetic elements that extend from the yoke-member towards the circular planar path described by the poles of said magnet as it rotates about said axis, said yoke-member interconnecting the ferromagnetic elements magnetically to provide from each said element a low-reluctance magnet path for said magnetization of the magnet, and a multiplicity of electrical windings that are inductively coupled to said elements, the different windings being energizable selectively to bring said magnet by magnetic attraction into register with different ones of said elements.

2. An electromagnetic device according to claim 1 wherein said ferromagnetic elements are of odd number and equally-spaced from one another about said axis.

3. An electromagnetic device according to claim 1 including a character-bearing drum coupled to the magnet to rotate therewith and thereby provide an indication of the angular position of the magnet about said axis.

4. An electromagentic indicating device comprising a permanent magnet mounted for rotation about an axis that is substantially normal to the magnetization of the magnet, a ferromagnetic yoke-member, means mounting the yoke-member spaced from the magnet's rotational plane, a multiplicity of elongated ferromagnetic elements which extend parallel to one another from the yoke-member towards the circular path described by the poles of said magnet as it rotates about said axis and which are equally spaced from one another about said axis, the yoke-member interconnecting said elements with low magnetic reluctance such that when the magnet is brought into register about said axis with any one of said elements the magnetization of the magnet acting via the relevant element and the yoke-member is effective to restrain the magnet in this position, electrical windings inductively coupled to said elements respectively for temporarily magnetizing said elements selectvely and one at a time to attract the magnet into register with the magnetized element, and an indicating element carried by the magnet about said axis to provide an indication dependent upon the position of the magnet about said axis.

5. An electromagnetic indicating device according to claim 4 wherein said indicating element is a character-bearing drum.

6. An electromagnetic indicating device according to claim 5 including means mounting said magnet and ferromagnetic elements substantially wholly within the drum.

7. An electromagnetic indicating device comprising a permanent magnet mounted for rotation about an axis that is substantially normal to the magnetization of the magnet, two ferromagnetic yoke-members, means mounting the two yoke-members spaced equally from the magnet in opposite directions along said axis, a multiplicity of elongated and equally-spaced ferromagnetic elements extending parallel to one another between the two yoke-members to encircle the magnet, the two-yoke-members each interconnecting said elements with low magnetic reluctance such that when the magnet is brought into register about said axis with any one of said elements its own magnetization acting via the relevant element and the two yoke-members is effective to restrain it in this position, electrical windings inductively coupled to said elements respectively for temporarily magnetizing said elements selectively and one at a time to attract the magnet into register with the magnetized element, each of said windings being inductively coupled in opposite senses to opposite ends of its respective element, and an indicating element carried by the magnet about said axis to provide an indication dependent upon the position of the magnet about said axis.

8. An electromagnetic indicating device according to claim 7 wherein said indicating element is a character-bearing drum.

9. An electromagnetic indicating device according to claim 8 wherein the characters borne by the drum are decimal digits.

10. An electromagnetic indicating device according to claim 8 including means mounting said magnet and ferromagnetic elements substantially wholly within the drum.

References Cited

UNITED STATES PATENTS

| | | | |
|---|---|---|---|
| 3,089,131 | 5/1963 | Morgan | 340—325 X |
| 3,118,138 | 1/1964 | Milas et al. | 340—378 |
| 3,311,911 | 3/1967 | Pursiano et al. | 340—324 X |
| 3,113,301 | 11/1959 | Templin. | |
| 3,353,174 | 11/1967 | Lang. | |

JOHN W. CALDWELL, Primary Examiner

H. PITTS, Assistant Examiner

U.S. Cl. X.R.

310—152, 366; 340—324, 325